Patented Oct. 3, 1944

2,359,345

UNITED STATES PATENT OFFICE 2,359,345

ACTIVE SILICATE COMPOSITIONS

Charles C. Winding, Ithaca, N. Y., assignor to Tide Water Associated Oil Company, Bayonne, N. J., a corporation of Delaware No Drawing. Application November 15, 1941, Serial No. 419,283

9 Claims. (Cl. 252—300)

The present invention relates to silicate adsorbent compositions, their method of preparation and their uses in the industrial arts. In general aspect the invention relates to magnesium or magnesium-containing silicate adsorbent compositions adapted for use in the refining of liquids from which it is desired to remove coloring matter or other impurities which may be selectively adsorbed by solid adsorbent material. More particularly, the invention provides a magnesium or magnesium-containing silicate of active adsorbent character having physical properties necessary for use in the "percolation" method of refining liquids with solid adsorptive agents.

Solid adsorbent compositions, both of natural and synthetic origin, are used extensively in the removal of coloring matter or otherwise refining liquids and solutions. The treatment of petroleum fractions, especially viscous oils of lubricating character, is an important illustrative example of the use of adsorbents for the removal of undesired components or constituents.

Two distinct methods of refining liquids, such for example as lubricating oils, with solid adsorbent compositions are in general use. One of these is the procedure commonly designated as contact treatment, and the other is usually identified as percolation. The two operations differ radically in manipulative detail, each predicated upon and requiring a distinct type and form of adsorbent material.

In contact treatment, the adsorbent must be very finely divided, for example 200 to 300 mesh, and hardness or resistance to attrition is not a consideration. Such contact decolorizing material is agitated in a body of oil at elevated temperature for sufficient time to obtain the desired degree of refining, after which the decolorized oil is separated from the spent adsorbent, usually by filtration.

The percolation method requires a relatively coarse, granular adsorbent material and the percolant particles must have hardness to a degree at least sufficient to withstand breakdown or attrition loss in handling operations. In decolorizing oils by percolation treatment, a deep static bed of adsorbent material is provided through which the oil filters or percolates. When, by reason of adsorbing coloring matter from the oil, the adsorbent material shows diminished activity, oil flow is cut off. After draining and steaming in situ the adsorbent may be removed by a suitable conveyor system to a furnace, such as the familiar multiple hearth, rabble-arm type, and revivified by burning.

Thus, it will be apparent that preparation of a synthetic adsorbent involves consideration of its contemplated use. Depending upon whether the adsorbent is to be used in contact treatment or in a percolation method, distinct and different properties or characteristics are required. A given adsorbent material cannot be used alternatively as a contact agent or a percolant. Adsorbent compositions having the form and properties necessary for contact use have no utility in percolation methods of refining, while adsorbent material in percolant form will not function satisfactorily as a contact agent.

The present invention is concerned with synthetic adsorbents having the form and properties necessary to "percolant" refining agents and especially prepared for and adapted to use in the percolation method of decolorizing oils. More particularly, the adsorbents or oil decolorizing agents of the invention are synthetic magnesium silicate compositions prepared by a multi-stage method, including a base or cation exchange reaction and involving specific procedural steps leading to the production of an active material in percolant form. The procedural steps of said method are similar to those disclosed and broadly claimed in my copending application Serial No. 419,109, filed November 14, 1941, of which the present application is a continuation-in-part. As there disclosed, the method comprises the general procedural steps of preparing a precipitated metal silicate composition which may be a calcium-containing silicate, a calcium and magnesium silicate, a barium silicate or a strontium silicate, by reacting aqueous solutions of a soluble silicate and an appropiate metal salt; separating the precipitated metal silicate composition as by filtration and washing; drying the precipitate; grinding the dried precipitate to suitable particle size; screening the ground dried material to remove "fines"; subjecting the dried, ground and screened material to cation or base exchange reaction with an aqueous solution of a magnesium salt; separating the resulting "exchange" magnesium silicate material as by filtration; and drying the separated "exchange" magnesium silicate composition.

The method of the present invention comprises in its more specific aspects the procedural steps of my said copending application outlined above, but is concerned primarily with use, as the solid silicate entering the exchange reaction, of barium or strontium-containing silicate compositions. Use of these compositions in the method is referred to but not specifically claimed in said copending application.

According to this invention, there are provided or produced silicates of barium or strontium having desired hardness and other physical properties which can be converted by the exchange reaction to active exchange magnesium silicate adsorbent compositions suitable for use in percolation refining methods. It is a particular feature and advantage of this invention and of that disclosed in said copending application that necessary physical properties and adsorbent activity of the percolant adsorbent final product resulting from the exchange reaction depends upon and is determined by the character and properties of the solid metal silicate which enters the said exchange reaction. Accordingly, the invention is concerned in an important embodiment with the production of a suitable or preconditioned barium or strontium silicate composition for use in a cation or base exchange reaction with an aqueous magnesium-containing soluble salt solution to produce directly a magnesium silicate composition having properties and characteristics of and necessary to a percolant type adsorbent of high oil-decolorizing activity.

As indicated hereinabove, preconditioned silicates suitable for use in the exchange reaction can be produced by precipitation methods in which soluble silicates are reacted with certain metal salts in aqueous solution. An important feature of the present invention resides in the production of such preconditioned silicates of barium and strontium by controlled or regulated steps involving precipitation by reacting soluble silicates and barium or strontium salts in aqueous solution. Certain controls are necessary in the preparation of the stated preconditioned silicates, according to the present invention, to the production of suitable or desirable physical properties therein. Physical properties such as the degree of hardness essential to reduction of the precipitated and dried material to desired sized particles, and adsorbent activity and resistance to breakdown of the final exchange adsorbent composition are properties determined by such factors as concentrations and types of starting materials in the precipitation step, temperature of precipitation, and degree of drying of the precipitated material.

The precipitation procedure comprises reaction of a suitable soluble silicate, as for example an alkali metal silicate, in solution, and a suitable salt of strontium or barium, such as the chlorides thereof, in solution. The concentrations of the two reactants are made such that the precipitated, washed and dried material is characterized by hardness and other physical properties desired for grinding to desired particle size, as will be further explained. These desirable properties are obtained only when the reactants are used in relatively low concentrations. When reactants of relatively high concentrations are used, the precipitated material is too soft and grinding results in powdered material unsuitable for conversion by the ensuing exchange reaction to active percolant adsorbents. While the actual range of desirable reactant concentrations may vary somewhat with use of different precipitation conditions such as temperature, satisfactory physical properties are generally obtained in the precipitate when using reactant concentrations of from about 0.12 molar to about 0.3 molar. In general, as the concentrations are increased above the stated range, there results upon drying and grinding of the precipitate increasingly large proportions of fines or particles unsuitable for exchange to percolant material, and use of concentrations below the stated range results in a lowering of the decolorizing power of the final exchange product.

Preferably the two reactants are employed in equimolar concentrations, but respectively different concentrations of each reactant may be used which will result in the stated desired properties in the precipitate.

The soluble silicate employed in the reaction is desirably of relatively high silica content, i. e., in the case of sodium silicate the ratio of $Na_2O$ to $SiO_2$ should be low, as for example 1 to 4. When higher ratios of $Na_2O$ to $SiO_2$ (for example 1:3 to 1:2) are used, the oil decolorizing activity of the final adsorbent product is somewhat lower than is the case when a one to four ratio sodium silicate is used in the precipitation step.

In practice the reactant solutions are heated, for example to 90° C., and the strontium or barium salt solution is added to the soluble silicate solution. Precipitation from hot solutions is preferable in most instances as giving precipitates convertible to exchange products of optimum decolorizing power, but lower precipitation temperatures may be used to advantage in some cases.

After the precipitation step the slurry containing the precipitated silicate which will comprise barium or strontium silicate is filtered, washed and dried.

The degree to which the precipitated silicate is dried is important, and regulated drying in conjunction with other steps of the process constitutes an important feature of this invention. The filtered and washed precipitate, produced as above, is a gelatinous mass which may contain upwards of 90% water (i. e., total water, as determined by heating samples at 1000 to 1200° C. for two to three hours). As such, this mass cannot be reduced to discrete particle size and if subjected to the exchange treatment will result in an exchange final product having substantially no oil-decolorizing power as a percolant adsorbent. According to this invention the solid silicate entering the exchange reaction is dried to or below a certain maximum water content prior to the exchange reaction. While the actual maximum water content permissible in all cases and for each particular silicate material employed may vary and no one value can be stated which will hold for all cases, it is in any event necessary to dry the precipitated silicate material to such a water content that it can be ground or similarly reduced to discrete solid particles. Obviously various drying temperatures and drying periods may be employed to obtain the desired product depending upon the particular apparatus and mode of drying employed. Of course, the material should not be heated to a temperature or for a period of time destructive to its capacity for conversion to active adsorbent material by the exchange reaction. In general, drying in heating atmospheres of temperatures up to 800° C. is satisfactory, using short drying periods at the higher temperatures and longer drying periods at the lower temperatures. Drying temperatures of from about 300° C. to about 600° C. are particularly effective.

The silicate material from the drying operation is in the form of a mass of hard particles of varying size depending on the degree of subdivision of the cake charged to the dryer and which are not readily powderable. The dried material is then ground, and screened if necessary, to desired particle size. Various types of grinding equipment may be employed; particularly satisfactory results are obtained by use of a disc grinder composed of stationary and rotary discs, using the free rather than the choked grinding method. Preferably the material is reduced to percolant sized particles, for example 30–60 mesh. An important feature of the invention resides in the fact that percolant sized exchange magnesium silicate adsorbent can be obtained directly from the ensuing exchange reaction when percolant sized solid silicate is used in the exchange reaction.

The dried precipitated silicate in the form of sized particles is then subjected to the cation or base exchange reaction by treatment with a solution containing magnesium ions, such as a solution of magnesium salt, for example magnesium chloride solution. This treating solution may contain compounds in addition to those of magnesium, as for example calcium salts, and may be of various concentrations as long as sufficient magnesium ions are present therein to replace the barium or strontium ions of the solid silicate. Particularly good results are obtained using exchange treating solutions of about 0.5 molar concentration as respects magnesium chloride contained therein. Desirably the treating solution is used hot (as, for example, 90° C.), since optimum decolorizing activity is obtained in the final exchange products, but lower temperatures, such as room temperature, produce satisfactory results.

Use of magnesium sulfate instead of or in addition to magnesium chloride is satisfactory, for while insoluble sulfates of barium or strontium are formed in such cases as a result of the exchange reaction, these insoluble sulfates are formed in very small particle size as compared to the coarse granular exchange magnesium silicate particles, and are readily suspended in the treating solution by slight agitation. Simple decantation of the treating solution removes a greater part of these sulfate particles and leaves the coarse exchange magnesium silicate particles behind. Any convenient method can be used in which advantage is taken of differences in particle sizes.

The exchange reaction may be carried out by stirring the solid silicate particles in the treating solution containing magnesium ions or by other suitable mode, such for example as by flowing the treating solution through a static bed of the solid silicate particles. The reaction may be a one-stage batch operation but usually is better conducted in a plurality of successive stages, as for example in two, three, or more stages, using fresh exchange or treating solution at each stage. The advantage of such treatment resides not only in degree of completeness as to base exchange but also in certain improvement of percolant adsorbent quality and activity. Continuous countercurrent or semi-countercurrent operation may be desirable.

The exchange magnesium silicate material from the exchange operation is then filtered, washed and dried at a temperature not destructive to the percolant decolorizing activity or physical properties of the material. Prolonged drying at temperatures above about 700° C. is generally destructive in this regard and should be avoided.

The exchange magnesium silicate prior to drying consists of a mass of wet particles resembling wet sand. The dried product is a mass of hard granular free-flowing particles of sizes corresponding generally to the sizes of the solid barium or strontium silicate particles used in the exchange reaction. Thus, as previously stated, exchange magnesium silicate particles of percolant size are obtained at this stage of the process if percolant sized particles of barium or strontium silicate have been used in the exchange reaction.

The product from the drying operation will usually contain a very low proportion of fines and for many uses need not be screened prior to use. For special uses, requiring a product of even more uniform particle size, screening may be resorted to.

Substantial amounts of the barium or strontium of the solid silicate precipitated material are converted to magnesium in the exchange reaction. The final product then will contain a substantial proportion of exchange magnesium silicate in association with unconverted precipitated barium silicate or strontium silicate.

While the reactant solutions to be reacted with the soluble silicate solution in the precipitation step have been referred to as containing barium or strontium salts, reactant solutions containing both barium and strontium salts as well as solutions containing, in addition to barium and/or strontium salts, other salts such as those of calcium or magnesium are contemplated and may be used to advantage.

Again, considerable variation is permissible in the type of magnesium salt solution employed in the exchange reaction. As indicated above, this solution need not be composed of pure magnesium salts. Mixed chlorides or other equivalently useful solutions containing sufficient magnesium ions may be used to advantage. As an example, aqueous exchange solutions containing both calcium and magnesium chlorides give worthwhile results. Several commercial brines are available on the open market in which the ratio of magnesium chloride to calcium chloride varies from about 1:2 to about 1:3 and these or similar mixed salt solutions, for example solutions in which the magnesium to calcium ratio is about one to one, may be utilized.

The following examples will serve to show illustrative embodiments of the invention.

*Example I*

1600 c. c. of a hot (85° C.) aqueous solution of barium chloride in 0.15 molar concentration were added to 1600 c. c. of a hot (85° C.) aqueous solution of sodium silicate (ratio of $Na_2O$ to $SiO_2=1:4$) of 0.15 molar concentration as to $Na_2O$ content. The mixture was agitated and maintained at about 85° C. until precipitation was complete.

The precipitate comprising barium silicate was then filtered and washed on a Buchner funnel. The washed filter-cake was placed in an ordinary laboratory drying oven having convection circulation of air, and heated at 120° C. for about 30 hours.

The dried material was hard and not readily powderable, and contained 9.5% water. This material was ground in a disc grinder and screened to 30–60 mesh particle size.

The sized particles of barium silicate composition were then mixed with an aqueous solution of magnesium chloride in 0.5 molar concentration and the resulting mixture of solids and liquid was mildly agitated, while maintaining its temperature at 85° C., for one hour. The treating solution was then drawn off, fresh treating solution added and the treatment was repeated.

The resulting mixture was then filtered and the solids were washed to remove treating solution. The washed solid material comprising exchange magnesium silicate was then dried in a laboratory drying oven at 120° C. for about 24 hours. The dried material was removed from the oven as a mass of free-flowing granular particles. The material was then screened to remove fines which were present in minor proportion.

The resulting material comprises exchange magnesium silicate in granular particles of 30-60 mesh size suitable for use in percolation adsorbent decolorizing methods.

*Example II*

1600 c. c. of a hot (85° C.) aqueous solution of strontium chloride in 0.15 molar concentration were added to 1600 c. c. of a hot (85° C.) aqueous solution of sodium silicate (ratio of $Na_2O$ to $SiO_2=1:4$) of 0.15 molar concentration as to $Na_2O$ content. The mixture was agitated and maintained at about 85° C. until precipitation was complete.

The precipitate comprising strontium silicate was filtered, washed and dried in the same manner as was the precipitate of Example I.

The resulting dried material contained 15.3% water. This material, which was hard and not readily powderable, was ground, screened and exchanged in the manenr described in Example I. The exchange product comprising exchange magnesium silicate was washed, dried and screened as in Example I to produce 30-60 mesh granular material suitable for use in percolation adsorbent decolorizing methods.

The products resulting from the methods of the above disclosed examples were each tested for oil decolorizing effectiveness as percolant adsorbents for oil filtration. The oil used in the test was an undecolorized, undewaxed Pennsylvania lubricating oil stock of 26.1 gravity, 50° F. pour point, 550° F. flash (closed cup) and 147 seconds Saybolt viscosity at 210° F. Said oil had an optical density color value of 2620 O. D. as measured by the method of Ferris and McIlvain as described in Industrial and Engineering Chemistry, Analytical edition 6, 23 (1934), except that a Bausch and Lomb monochromatic green filter was used as the source of monochromatic light. This oil was first diluted with decolorized Stoddard's solvent to give a solution of 40% oil and 60% Stoddard's solvent by volume. The oil solution was then slowly run through a bed of the adsorbent. The bed consisted of 100 c. c. of adsorbent (measured without tapping), the bed being 21 inches deep. The adsorbent was maintained at approximately 135° F. during filtration of the oil therethrough. When all of the oil in the oil solution which had passed through the filter reached a color corresponding to a 7 A. S. T. M. color as determined by comparisons with samples of known color, the run was considered complete. The run required about 4 hours time.

From the volume of oil filtered and the volume of adsorbent used in the test the volume ratio was computed. Volume ratio is the ratio of the volume of decolorized oil, exclusive of the solvent, to the volume of adsorbent used. The results are summarized in the following table, which includes data obtained by testing as described the silicates of Examples I and II and that obtained by testing under the same test conditions an adsorbent which is now commercially used in percolation lubricating oil decolorization. The latter material is designated as adsorbent "A."

| Adsorbent | Volume ratio |
|---|---|
| Example I | 1.4 |
| Example II | 1.7 |
| Adsorbent "A" | 1.6 |

As indicated by the above data, the adsorbent compositions of this invention are substantially as good or better percolant oil-decolorizing adsorbents as the adsorbent "A" which is widely used in the oil industry as a percolant oil-decolorizing agent.

I claim:

1. The method for producing magnesium silicate compositions effective for the decolorization of liquids by percolant methods which comprises reacting in aqueous solution a soluble silicate and a soluble salt of a metal selected from the group consisting of barium and strontium to produce a silicate of said metal having desired physical properties, removing liquid from said precipitate, drying said precipitate to produce a hard mass, reducing said hard mass to desired particle size and treating the resulting particles with an aqueous solution containing magnesium ions to exchange metal ions of the silicate particles with magnesium ions.

2. The method for producing magnesium silicate compositions effective for the decolorization of liquids by percolant methods which comprises reacting a hot aqueous solution containing alkali metal silicate with a hot aqueous solution containing a soluble salt of a metal selected from the group consisting of barium and strontium, the concentrations of said solutions being relatively low to produce a metal silicate precipitate of desired hardness and other physical properties, drying said precipitate to a grindable mass, grinding said mass to desired particle size, treating the resulting particles with an aqueous solution containing magnesium ions to exchange metal ions of the metal silicate thereof with magnesium ions.

3. Method for producing magnesium silicate compositions effective for the decolorization of liquids by percolation methods which comprises adding to a hot aqueous sodium silicate of concentration from about 0.12 molar to about 0.3 molar, based on the $Na_2O$ content, a hot aqueous solution of a salt of a metal selected from the group consisting of barium and strontium of concentration from about 0.12 molar to about 0.3 molar and maintaining the reaction mass hot to produce a precipitated silicate of said metal, filtering and drying the precipitate to a hard grindable material, reducing said material to percolant particle size, treating the resulting particulate mass with a magnesium salt solution to exchange ions of the metal silicate with magnesium ions.

4. Method as described in claim 3, in which the said metal salt is a chloride.

5. Method as described in claim 3, in which the sodium silicate solution and the metal salt solution are each of about 0.15 molar concentration.

6. The method for producing magnesium silicate adsorbent compositions effective for the decolorization of liquids which comprises precipitating from aqueous solution a silicate material of desired physical properties comprising a metal silicate selected from the group consisting of barium silicate and strontium silicate, drying said silicate material to produce a hard broken mass, and treating the dried material with a solution containing magnesium ions to exchange metal ions of said metal silicate with ions of magnesium.

7. Method for decolorizing oils comprising contacting the oil to be decolorized with an adsorbent composition produced as defined in claim 6.

8. A magnesium silicate adsorbent composition effective for the decolorization of oils, said composition having been produced by the method defined in claim 6.

9. A magnesium silicate adsorbent composition effective for the decolorization of liquids by percolation methods which comprises reacting in aqueous solution an alkali metal silicate in concentration from about 0.12 molar to about 0.3 molar, based on the $Na_2O$ content thereof, with a salt of a metal selected from the group consisting of barium and strontium in concentration from about 0.12 molar to about 0.3 molar to produce a precipitated silicate of said metal, drying the precipitate to a grindable condition and treating the dried material with an aqueous solution containing magnesium ions to exchange ions of the metal silicate with magnesium ions.

CHAS. C. WINDING.